United States Patent
Copty et al.

(10) Patent No.: US 11,409,501 B1
(45) Date of Patent: Aug. 9, 2022

(54) DETECTING INFRASTRUCTURE AS CODE COMPLIANCE INCONSISTENCY IN A MULTI-HYBRID-CLOUD ENVIRONMENT

(71) Applicant: International Business Machines Corporation, Armonk, NY (US)

(72) Inventors: Fady Copty, Nazareth (IL); Shripad Nadgowda, Elmsford, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/363,048

(22) Filed: Jun. 30, 2021

(51) Int. Cl.
G06F 8/10 (2018.01)
G06F 11/32 (2006.01)
G06F 8/36 (2018.01)
G06F 11/36 (2006.01)
G06F 8/35 (2018.01)

(52) U.S. Cl.
CPC .............. G06F 8/10 (2013.01); G06F 8/35 (2013.01); G06F 8/36 (2013.01); G06F 11/327 (2013.01); G06F 11/3688 (2013.01)

(58) Field of Classification Search
None
See application file for complete search history.

(56) References Cited

U.S. PATENT DOCUMENTS

| | | | | |
|---|---|---|---|---|
| 7,653,893 B2 * | 1/2010 | Neumann | ............... | G06F 8/71 717/124 |
| 2014/0040990 A1 * | 2/2014 | Nguyen | ............... | H04L 41/00 726/4 |
| 2017/0026416 A1 * | 1/2017 | Carpenter | ............ | H04L 41/0866 |
| 2019/0318312 A1 * | 10/2019 | Foskett | ................. | G06F 9/5072 |
| 2020/0387607 A1 * | 12/2020 | Bowling | ................. | G06F 21/12 |
| 2021/0055927 A1 * | 2/2021 | Sarukkai | ................... | G06F 8/71 |
| 2022/0164900 A1 * | 5/2022 | Pandit | .................... | G06Q 50/28 |

OTHER PUBLICATIONS

Rahman, "Characterizing Defective Configuration Scripts Used for Continuous Deployment", 2018, IEEE (Year: 2018).*
Li, "Similarity Measure for Security Policies in Service Provider Selection", 2015, ICISS2015 (Year: 2015).*
"Adding a security policy to your repository", GitHub.com, downloaded from the internet on Apr. 19, 2021, 3 pages, <https://docs.github.com/en/code-security/security-advisories/adding-a-security-policy-to-your-repository>.
Bregman, Jonathan, "Shift-Left with IaC Build Policies in Prisma Cloud", Paloalto Networks, Jun. 9, 2020, 3 pages.
Kousiouris et al., "Translation of Application-level Terms to Resource-level attributes across the Cloud Stack Layers", 2011 IEEE Symposium on Computers and Communications (ISCC), DOI: 10.1109/ISCC.2011.5984009, 8 pages.

(Continued)

Primary Examiner — Hossain M Morshed
(74) Attorney, Agent, or Firm — Gilbert Harmon, Jr.

(57) ABSTRACT

An approach for detecting non-compliant methodologies in a repository. The approach can generate an abstract model of an Infrastructure as Code (IaC) repository based on security requirements of an IaC. The approach can compare the abstract model to one or more validated abstract models associated with other repositories of a hybrid multi-cloud system. The approach can generate an alert notifying the IaC repository of one or more non-compliant methodology measures. The approach can send the alert to the IaC repository.

20 Claims, 5 Drawing Sheets

(56) References Cited

OTHER PUBLICATIONS

Li et al., "Similarity Measure for Security Policies in Service Provider Selection", 11th International Conference on Information Systems Security (ICISS2015), Lecture Notes in Computer Science, vol. 9478, 16 pages, <https://link.springer.com/chapter/10.1007%2F978-3-319-26961-0_14>.
Mell et al., "The NIST Definition of Cloud Computing", Recommendations of the National Institute of Standards and Technology, Special Publication 800-145, Sep. 2011, 7 pages.
Patterson, Chris, "GitHub Actions adds policy controls for organization and repository owners", The GitHub Blog, Oct. 3, 2019, 4 pages.
Wurster et al., "Technology-Agnostic Declarative Deployment Automation of Cloud Applications", European Conference on Service-Oriented and Cloud Computing (ESOCC 2020), Lecture Notes in Computer Science, vol. 12054, First Online: Mar. 27, 2020, 18 pages, <https://doi.org/10.1007/978-3-030-44769-4_8>.

\* cited by examiner

DETECTING INFRASTRUCTURE AS CODE COMPLIANCE INCONSISTENCY IN A MULTI-HYBRID-CLOUD ENVIRONMENT

TECHNICAL FIELD

The present invention relates generally to managing Infrastructure as Code (IaC), and more specifically, managing IaC in a multi-hybrid-cloud environment.

BACKGROUND

Large software projects typically are maintained over several code repositories. As cloud technology has evolved, projects such as Infrastructure as Code (IaC) have mirrored this evolution and are also spanning several repositories. Further, these projects are expanding across multiple cloud providers, i.e., multi-hybrid-cloud environments. In this multi-hybrid-cloud environment, a plurality of software engineers is required to maintain these repositories.

Further, a supervisory engineer (architect/manager) is required to confirm that all of the organization's compliance methodologies are maintained coherently across all repositories based on the circumstances that while each one of the repositories may not have any security issues as a stand-alone repository, there is a need to confirm all are coherent and following the same security measures to prevent issues based on a particular one or more hybrid-cloud environments adhering to substandard procedures.

BRIEF SUMMARY

According to an embodiment of the present invention, a computer-implemented method for generating an alert when a security characteristic of an Infrastructure as Code (IaC) repository is non-compliant, the computer-implemented method comprising: generating, by one or more processors, an abstract model of an IaC repository based on security requirements of an IaC; comparing, by the one or more processors, the abstract model to one or more validated abstract models associated with other repositories, respectively, of a hybrid multi-cloud system; responsive to the comparing exceeding a predetermined similarity threshold, generating, by the one or more processors, an alert notifying the IaC repository of one or more non-compliant security measures; and sending, by the one or more processors, the alert to the IaC repository.

According to an embodiment of the present invention, a computer program product for classification of ordered data, the computer program product comprising: one or more non-transitory computer readable storage media and program instructions stored on the one or more non-transitory computer readable storage media, the program instructions comprising: program instructions to generate an abstract model of an IaC repository based on security requirements of an IaC; program instructions to compare the abstract model to one or more validated abstract models associated with other repositories, respectively, of a hybrid multi-cloud system; responsive to the comparing exceeding a predetermined similarity threshold, program instructions to generate an alert notifying the IaC repository of one or more non-compliant security measures; and program instructions to send the alert to the IaC repository.

According to an embodiment of the present invention, a computer system for classification of ordered data, the computer system comprising: one or more computer processors; one or more non-transitory computer readable storage media; and program instructions stored on the one or more non-transitory computer readable storage media, the program instructions comprising: program instructions to generate an abstract model of an IaC repository based on security requirements of an IaC; program instructions to compare the abstract model to one or more validated abstract models associated with other repositories, respectively, of a hybrid multi-cloud system; responsive to the comparing exceeding a predetermined similarity threshold, program instructions to generate an alert notifying the IaC repository of one or more non-compliant security measures; and program instructions to send the alert to the IaC repository.

Other aspects and embodiments of the present invention will become apparent from the following detailed description, which, when taken in conjunction with the drawings, illustrate by way of example the principles of the invention.

DETAILED DESCRIPTION

Figure 1:
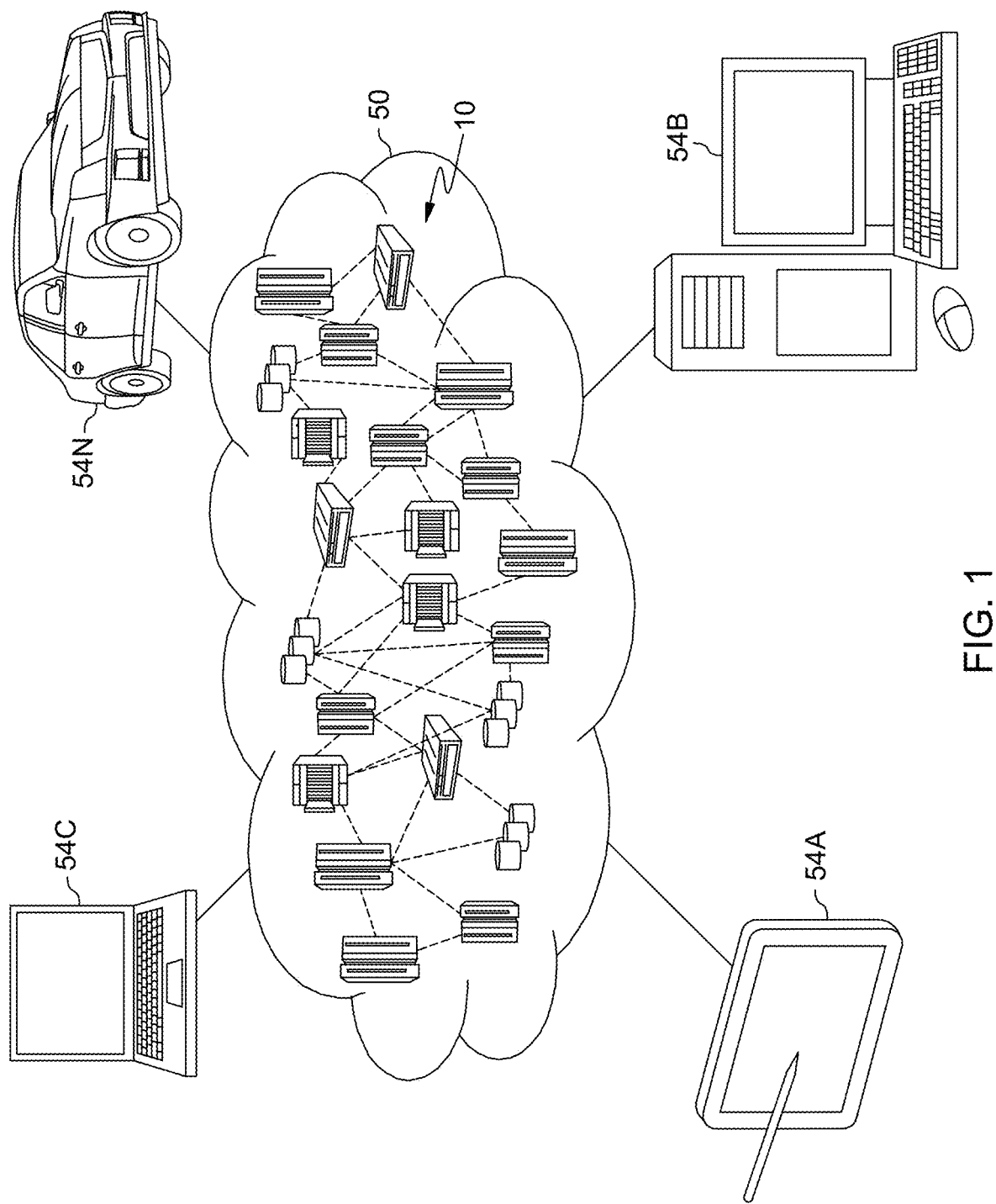
FIG. 1 depicts a cloud computing environment, according to embodiments of the present invention.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several embodiments of managing Infrastructure as Code (IaC) in a multi-hybrid-cloud environment. The embodiments can build an abstract security architecture model of the IaC for each hybrid-cloud provider. It should be noted that the abstract security architecture model can represent the security standards of the IaC but does not fully define the IaC code and can include meta-structure of security components. It should also be noted that each abstract model does not represent the various features of cloud resources that can vary based on a provider.

Accordingly, each abstract model can be used to describe the security measures taken in the specific IaC code for the specific hybrid-cloud provider. The embodiments can compare the abstract IaC models of the various repositories associated with the hybrid-clouds and detect any repository that is not coherent, i.e., within a predefined tolerance of all other models and their associated security measures. The embodiments can alert an identified repository, and the identified repository's associated administrator, that the repository is not coherent with the required security measures.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
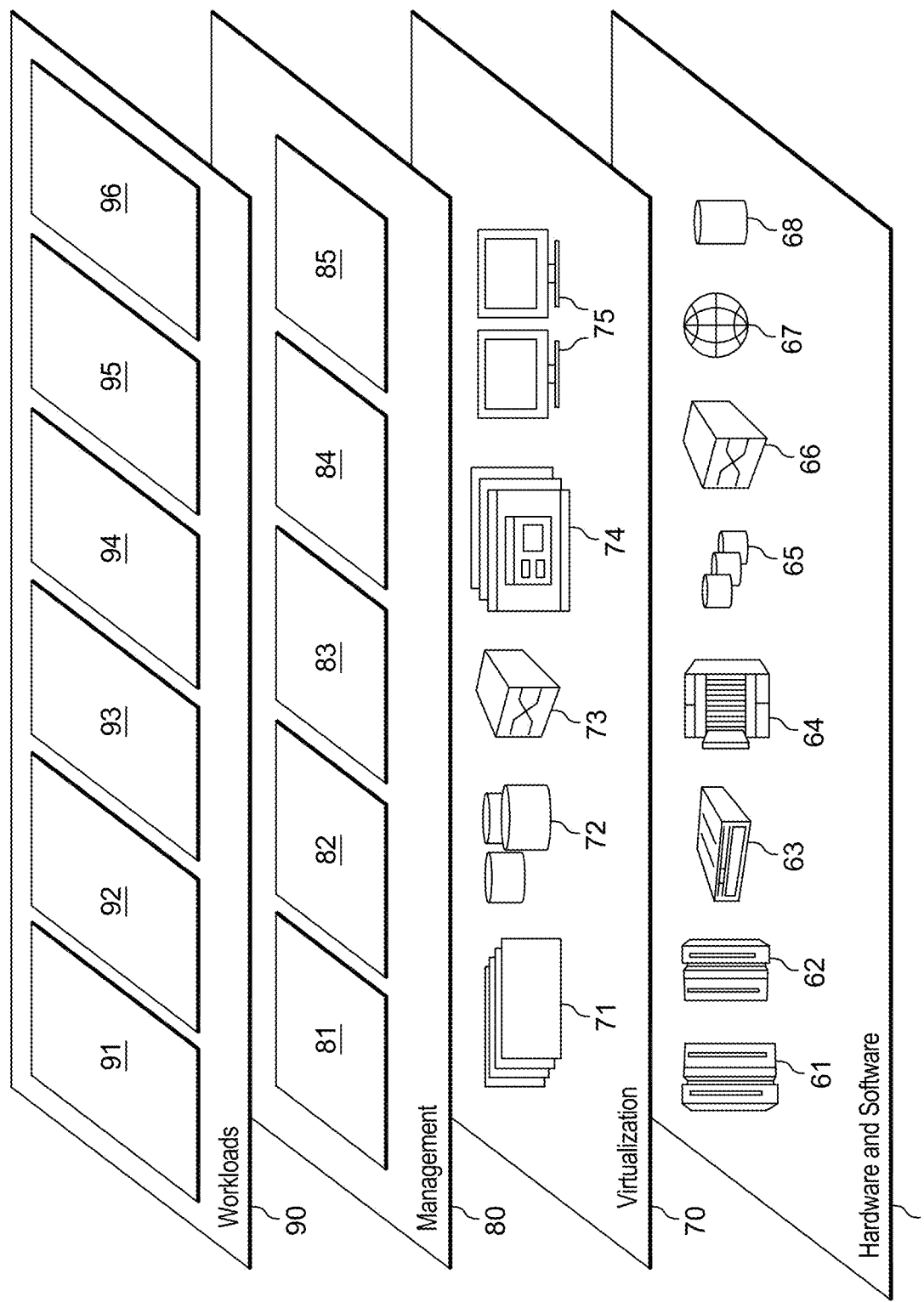
FIG. 2 depicts abstraction model layers, according to embodiments of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 include hardware and software components. Examples of hardware components include mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and IaC compliance management 96.

It should be noted that the embodiments of the present invention may operate with a user's permission. Any data may be gathered, stored, analyzed, etc., with a user's consent. In various configurations, at least some of the embodiments of the present invention are implemented into an opt-in application, plug-in, etc., as would be understood by one having ordinary skill in the art upon reading the present disclosure.

Figure 3:
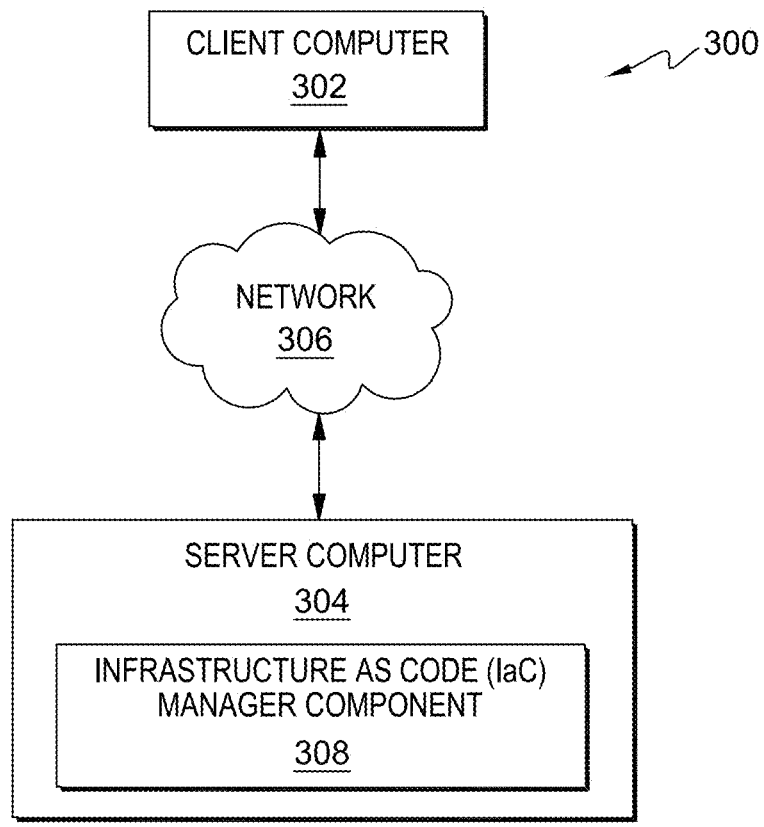
FIG. 3 is a high-level architecture, according to embodiments of the present invention.
Figure 4:
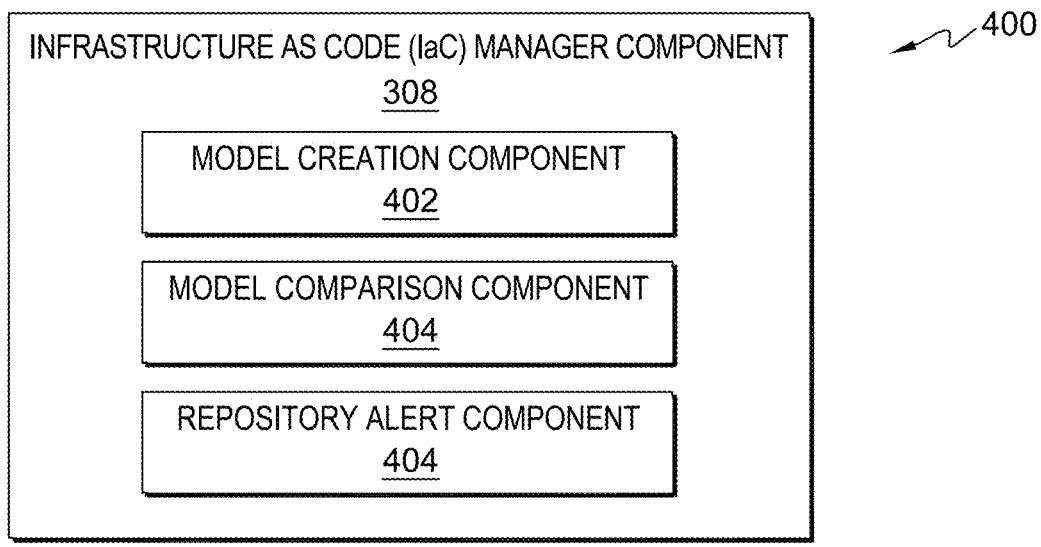
FIG. 4 is an exemplary detailed architecture, according to embodiments of the present invention.
Figure 5:
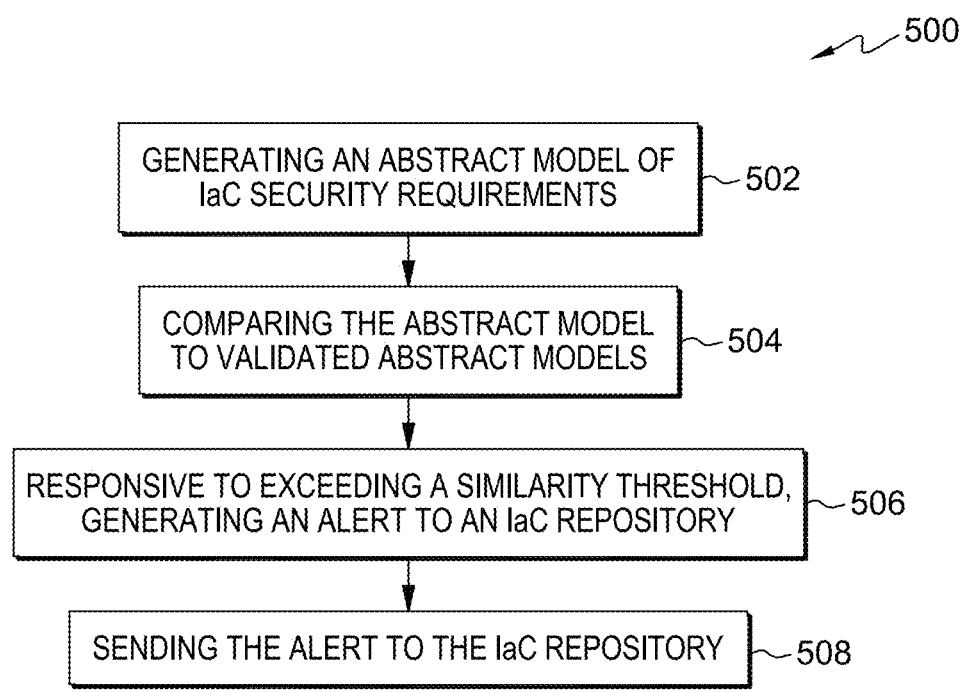
FIG. 5 is a flowchart of a method, according to embodiments of the present invention.

FIG. 3 is a high-level architecture for performing various operations of FIG. 5, in accordance with various embodiments. The architecture 300 may be implemented in accordance with the present invention in any of the environments depicted in FIGS. 1-4, among others, in various embodiments. Of course, more or less elements than those specifically described in FIG. 3 may be included in architecture 300, as would be understood by one of ordinary skill in the art upon reading the present descriptions.

Each of the steps of the method 500 (described in further detail below) may be performed by any suitable component of the architecture 300. A processor, e.g., processing circuit (s), chip(s), and/or module(s) implemented in hardware and/or software, and preferably having at least one hardware component may be utilized in any device to perform one or more steps of the method 500 in the architecture 300. Illustrative processors include, but are not limited to, a central processing unit (CPU), an application specific integrated circuit (ASIC), a field programmable gate array (FPGA), etc., combinations thereof, or any other suitable computing device known in the art.

Architecture 300 includes a block diagram, showing a detection system of non-compliant Infrastructure as Code (IaC) with respect to security requirements, to which the invention principles may be applied. The architecture 300 comprises a client computer 302, an IaC manager component 308 operational on a server computer 304 and a network 306 supporting communication between the client computer 302 and the server computer 304.

Client computer 302 can be any computing device on which software is installed for which an update is desired or required. Client computer 302 can be a standalone computing device, management server, a web server, a mobile computing device, or any other electronic device or computing system capable of receiving, sending, and processing data. In other embodiments, client computer 302 can represent a server computing system utilizing multiple computers as a server system. In another embodiment, client computer 302 can be a laptop computer, a tablet computer, a netbook computer, a personal computer, a desktop computer or any programmable electronic device capable of communicating with other computing devices (not shown) within user persona generation environment via network 306.

In another embodiment, client computer 302 represents a computing system utilizing clustered computers and components (e.g., database server computers, application server computers, etc.) that act as a single pool of seamless resources when accessed within install-time validation environment of architecture 300. Client computer 302 can include internal and external hardware components, as depicted and described in further detail with respect to FIG. 5.

Server computer 304 can be a standalone computing device, management server, a web server, a mobile computing device, or any other electronic device or computing system capable of receiving, sending, and processing data. In other embodiments, server computer 304 can represent a server computing system utilizing multiple computers as a server system. In another embodiment, server computer 304 can be a laptop computer, a tablet computer, a netbook computer, a personal computer, a desktop computer, or any programmable electronic device capable of communicating with other computing devices (not shown) within install-time validation environment of architecture 300 via network 306.

Network 306 can be, for example, a local area network (LAN), a wide area network (WAN) such as the Internet, or a combination of the two, and can include wired, wireless, or fiber optic connections. In general, network 306 can be any combination of connections and protocols that will support communications between client computer 302 and server computer 304.

IaC manager component 308, operational on server computer 304, can create an abstract model of the IaC. The created abstract model can be a limited model and can represent only the security standards associated with the IaC. It should be noted that the abstract model does not fully define the IaC code. For example, the abstract model does not represent the various features of cloud resources that can vary between different cloud service providers. Accordingly, the abstract model is normalized to describing only the security measures taken in an IaC code implementation for a respective cloud service provider.

In one aspect, IaC manager component 308 can compare a plurality of abstract models to each other or to a predefined standard abstract model and determine if one or more of the abstract models are not coherent with the other abstract models or to the predefined standard abstract model. It should be noted that a predefined standard abstract model can be created based on desired security features or selected from the pool of created abstract models based on the abstract model most closing resembling a desired security abstract model. It should further be noted that an abstract model selected from the pool of abstract models can be further updated automatically or by user input to align the selected abstract model with a required security policy.

In another aspect, IaC manager component 308 can send an alert notification that an identified repository is not coherent with the predefined methodologies and security requirements. IaC manager component 308 can send the notification to an architect or manager of the IaC project as well as an administrator responsible for the repository. IaC manager component 308 can provide information in the notification that describes the security requirements and the missing aspects discovered by the analysis.

FIG. 4 is an exemplary detailed architecture for performing various operations of FIG. 5, in accordance with various embodiments. The architecture 400 may be implemented in accordance with the present invention in any of the environments depicted in FIGS. 1-3 and 5, among others, in various embodiments. Of course, more or less elements than those specifically described in FIG. 4 may be included in architecture 400, as would be understood by one of skill in the art upon reading the present descriptions.

Each of the steps of the method 500 (described in further detail below) may be performed by any suitable component of the architecture 400. A processor, e.g., processing circuit(s), chip(s), and/or module(s) implemented in hardware and/or software, and preferably having at least one hardware component, may be utilized in any device to perform one or more steps of the method 500 in the architecture 400. Illustrative processors include, but are not limited to, a central processing unit (CPU), an application specific integrated circuit (ASIC), a field programmable gate array (FPGA), etc., combinations thereof, or any other suitable computing device known in the art.

Architecture 400 provides a detailed view of at least some of the modules of architecture 300. Architecture 400 can comprise an IaC manager component 308, which can further comprise a model creation component 402, a model comparison component 404 and a repository alert component 406.

In one embodiment of the present invention, model creation component 402 can provide the capability to create an abstract model of an IaC system. In creating the abstract model, model creation component 402 can include information, i.e., meta-structure, such as, but not limited to, structure of access groups (including nested groups), structure of resource groups, structure of logging, structure of network security, structure of data security, security tool configurations, virtual private cloud (VPC) security groups, etc.

For example, model creation component 402 can include, but is not limited to, number of levels in nesting of access groups, number of services in resource group, types of services in resource group, archived logs expiration date, type of ports in security groups, use of intrusion prevention system (IPS) lists, web application firewall (WAF) use of customized rules, encryption methods e.g., bring your own key (BYOK) and keep your own key (KYOK), etc. Model creation component 402 can create an abstract model for each vendor's repository. It should be noted that the abstract model includes only the security standards of the IaC and does not include differentiating features provided by the various vendors.

In another aspect of an embodiment of the present invention, model creation component 402 can translate a created model into a provider-agnostic model based on using a mapping, i.e., dictionary, of various resources, constructs, and underlying architecture assumptions across providers. It should be noted that the aforementioned model creation by model creation component 402 can also be accomplished by transfer learning techniques based on leveraging pre-trained models. For example, Kousiouris, George & Kyriazis, Dimosthenis & Gogouvitis, Spyridon & Menychtas, Andreas & Konstanteli, Kleopatra & Varvarigou, Theodora. (2011). Translation of application-level terms to resource-level attributes across the Cloud stack layers. Proceedings—IEEE Symposium on Computers and Communications. 153-160. 10.1109/ISCC.2011.5984009.

In another embodiment of the present invention, model comparison component 404 can provide the capability to compare the IaC abstract models associated with the various repositories based on similarity techniques across security verticals. For example, similarity measures such as, but not limited to, Li Y., Cuppens-Boulahia N., Crom J M., Cuppens F., Frey V., Ji X. (2015) Similarity Measure for Security Policies in Service Provider Selection. In: Jajoda S., Mazumdar C. (eds) Information Systems Security. ICISS 2015. Lecture Notes in Computer Science, vol 9478. Springer, Cham. https://doi.org/10.1007/978-3-319-26961-0_14. In another aspect, a predetermined similarity threshold can be employed to determine noncompliant abstract models based on exceeding the predetermined similarity threshold.

In one aspect of an embodiment of the present invention, model comparison component 404 can compare an abstract model associated with a new repository to abstract models associated with a list of current repositories whenever a new repository is incorporated into the system. In another aspect of an embodiment of the present invention, an abstract model associated with a new repository can be compared by model comparison component 404 to a template abstract model whenever a new repository is incorporated into the system. It should be noted that in the previously described comparison cases, a predetermined similarity threshold can be employed to assess if the new abstract model has acceptable security characteristics. For example, abstract models can be compared based on detecting repository drift such as, but not limited to, a drift of a repository's security characteristics from another repositories, and cluster a plurality of repositories and detect a drift of the repository cluster from an expected ranking.

In another embodiment of the present invention, repository alert component 406 can generate an alert reflecting a determination by model comparison component 404 that security procedures associated with a repository have not met the predetermined similarity threshold. In another aspect, repository alert component 406 can include a description of the security shortcomings identified in the repository and suggestions of desired security procedures to be added to the repository. In another aspect, the alert can provide notice to the administrators of the repository and the client attempting to incorporate the repository into their IaC system that the repository is not coherent with their methodologies.

In another aspect of the embodiment, repository alert component 406 can perform the alert notification to the repository during the continuous integration (CI) phase of the development process. For example, on a repository's drift from other repositories or a drift from a ranking expectation, provided by either a user or an automated system. It should be noted that this can be as part of a code validation process before new code is added to the repository. In another embodiment of the present invention, repository alert component 406 can perform the alert notification to the repository during an asynchronous testing phase. For example, once a developer's changes to an application are merged, those changes are validated by automatically building the application and running different levels of automated testing, typically unit and integration tests, to ensure the changes haven't broken the app.

FIG. 5 is an exemplary flowchart of a method 500 for detecting non-compliant security measures. At step 502, an embodiment can generate, via model creation component 402, an abstract model of IaC security requirements. At step 504, the embodiment can compare, via model comparison component 404, the abstract model to one or more validated abstract models. At step 506, the embodiment can, responsive to exceeding a similarity threshold, generate, via repository alert component 406, an alert for an IaC repository. At step 508, the embodiment can send, via repository alert component 406, the generated alert to the IaC repository.

Figure 6:
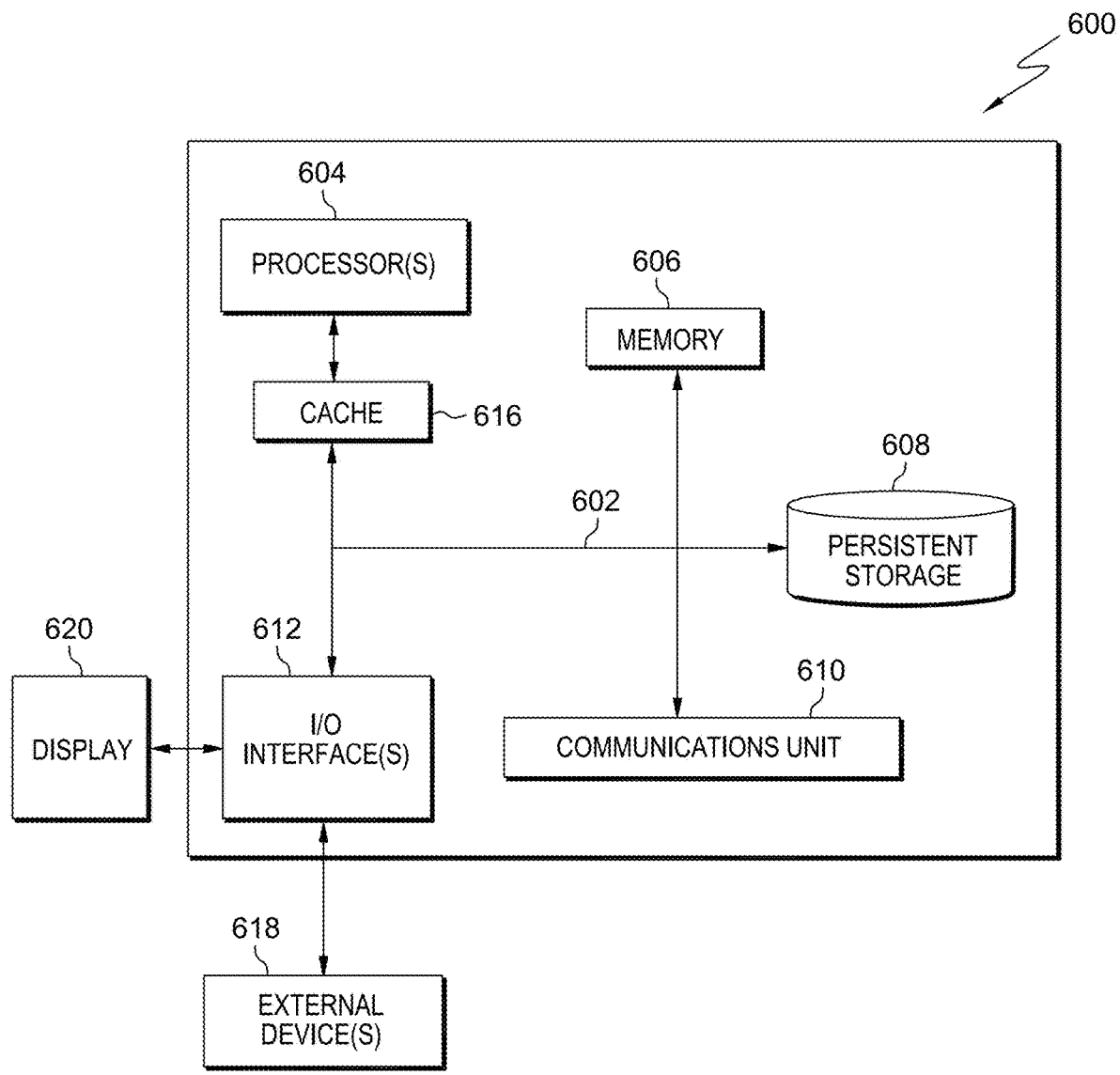
FIG. 6 is a block diagram of internal and external components of a data processing system in which embodiments described herein may be implemented, according to embodiments of the present invention.

FIG. 6 depicts computer system 600, an example computer system representative of client computer 302 and server computer 304. Computer system 600 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Computer system 600 includes processors 604, cache 616, memory 606, persistent storage 608, communications unit 610, input/output (I/O) interface(s) 612 and communications fabric 602. Communications fabric 602 provides communications between cache 616, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses or a crossbar switch.

Memory 606 and persistent storage 608 are computer readable storage media. In this embodiment, memory 606 includes random access memory (RAM). In general, memory 606 can include any suitable volatile or non-volatile computer readable storage media. Cache 616 is a fast memory that enhances the performance of processors 604 by holding recently accessed data, and data near recently accessed data, from memory 606.

Program instructions and data used to practice embodiments of the present invention may be stored in persistent storage 608 and in memory 606 for execution by one or more of the respective processors 604 via cache 616. In an embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. Program instructions and data used to practice embodiments of the present invention may be downloaded to persistent storage 608 through communications unit 610.

I/O interface(s) 612 allows for input and output of data with other devices that may be connected to each computer system. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention can be stored on such portable computer readable storage media and can be loaded onto persistent storage 608 via I/O interface(s) 612. I/O interface(s) 612 also connect to display 620.

Display 620 provides a mechanism to display data to a user and may be, for example, a computer monitor.

The components described herein are identified based upon the application for which they are implemented in a specific embodiment of the invention. However, it should be appreciated that any particular component nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating an alert when methodologies of an Infrastructure as Code (IaC) repository are non-compliant, the computer-implemented method comprising:
   generating, by one or more processors, an abstract model of an IaC repository based on security requirements of an IaC;
   comparing, by the one or more processors, the abstract model to one or more validated abstract models associated with other repositories, respectively, of a hybrid multi-cloud system;
   responsive to the comparing exceeding a predetermined similarity threshold, generating, by the one or more processors, an alert notifying the IaC repository of one or more non-compliant methodologies; and
   sending, by the one or more processors, the alert to the IaC repository.

2. The computer-implemented method of claim 1, wherein the abstract model comprises one or more of a structure of access groups, a structure of nested access groups, a structure of resource groups, a structure of logging, a structure of network security and a structure of data security.

3. The computer-implemented method of claim 1, wherein the one or more validated abstract models is a template model created by an IaC administrator based on desired security requirements.

4. The computer-implemented method of claim 1, wherein the one or more validated abstract models are a plurality of abstract models previously created for an associated plurality of IaC repositories.

5. The computer-implemented method of claim 1, further comprising:
   sending, by the one or more processors, the alert to an administrator associated with the IaC.

6. The computer-implemented method of claim 1, wherein the alert is generated and sent during a continuous integration (CI) phase of a development process.

7. The computer-implemented method of claim 1, wherein the alert is generated and sent during an asynchronous testing phase of a development process.

8. A computer program product for generating an alert when methodologies of an Infrastructure as Code (IaC) repository are non-compliant, the computer program product comprising:
   one or more non-transitory computer readable storage media and program instructions stored on the one or more non-transitory computer readable storage media, the program instructions comprising:
   program instructions to generate an abstract model of an IaC repository based on security requirements of an IaC;
   program instructions to compare the abstract model to one or more validated abstract models associated with other repositories, respectively, of a hybrid multi-cloud system;
   responsive to the comparing exceeding a predetermined similarity threshold, program instructions to generate an alert notifying the IaC repository of one or more non-compliant methodologies; and
   program instructions to send the alert to the IaC repository.

9. The computer program product of claim 8, wherein the abstract model comprises one or more of a structure of access groups, a structure of nested access groups, a structure of resource groups, a structure of logging, a structure of network security and a structure of data security.

10. The computer program product of claim 8, wherein the one or more validated abstract models is a template model created by an IaC administrator based on desired security requirements.

11. The computer program product of claim 8, wherein the one or more validated abstract models are a plurality of abstract models previously created for an associated plurality of IaC repositories.

12. The computer program product of claim 8, further comprising:
    sending, by the one or more processors, the alert to an administrator associated with the IaC.

13. The computer program product of claim 8, wherein the alert is generated and sent during a continuous integration (CI) phase of a development process.

14. The computer program product of claim 8, wherein the alert is generated and sent during an asynchronous testing phase of a development process.

15. A computer system for generating an alert when methodologies of an Infrastructure as Code (IaC) repository are non-compliant, the computer system comprising:
    one or more computer processors;
    one or more non-transitory computer readable storage media; and
    program instructions stored on the one or more non-transitory computer readable storage media, the program instructions comprising:
    program instructions to generate an abstract model of an IaC repository based on security requirements of an IaC;
    program instructions to compare the abstract model to one or more validated abstract models associated with other repositories, respectively, of a hybrid multi-cloud system;
    responsive to the comparing exceeding a predetermined similarity threshold, program instructions to generate an alert notifying the IaC repository of one or more non-compliant methodologies; and
    program instructions to send the alert to the IaC repository.

16. The computer system of claim 15, wherein the abstract model comprises one or more of a structure of access groups, a structure of nested access groups, a structure of resource groups, a structure of logging, a structure of network security and a structure of data security.

17. The computer system of claim 15, wherein the one or more validated abstract models is a template model created by an IaC administrator based on desired security requirements.

18. The computer system of claim 15, wherein the one or more validated abstract models are a plurality of abstract models previously created for an associated plurality of IaC repositories.

19. The computer system of claim 15, further comprising:
   sending, by the one or more processors, the alert to an administrator associated with the IaC.

20. The computer system of claim 15, wherein the alert is generated and sent during a continuous integration (CI) phase of a development process or during an asynchronous testing phase of a development process.

\* \* \* \* \*